United States Patent [19]
Foster

[11] 3,811,655
[45] May 21, 1974

[54] TENSIONING DEVICE
[76] Inventor: Howard F. Foster, 4500 Cavendish Cir., Fort Lauderdale, Fla. 33309
[22] Filed: Mar. 29, 1973
[21] Appl. No.: 346,019

[52] U.S. Cl. .................................. 254/161, 24/71.2
[51] Int. Cl. ............................................. B66d 1/00
[58] Field of Search..... 24/68 R, 68 BT, 68 D, 71.2, 24/71.1, 16, 19, 269; 248/361 A; 242/96; 254/161, 51

[56] References Cited
UNITED STATES PATENTS

| | | | |
|---|---|---|---|
| 3,416,763 | 12/1968 | Moreno | 24/71.2 X |
| 3,673,642 | 7/1972 | Harwell | 24/68 D |
| 2,451,389 | 10/1948 | Howe | 254/161 |
| 1,963,436 | 6/1934 | Dumke | 24/71.2 X |
| 669,506 | 3/1901 | Clark | 24/71.2 |
| 1,252,645 | 1/1918 | Baier et al. | 254/161 X |

Primary Examiner—Evon C. Blunk
Assistant Examiner—James L. Rowland
Attorney, Agent, or Firm—Oltman & Flynn

[57] ABSTRACT

A device for tensioning a flexible element, such as a strap or cable. The device includes a U-shaped frame with aligned, circular openings in its opposite legs, and a slotted tensioning plate extending across the space between the legs of the U-shaped frame and rotatably received in said openings. A locking member is removably inserted to hold the tensioning plate against rotation. The locking member may be inserted and removed without shifting the tensioning plate axially.

8 Claims, 7 Drawing Figures

PATENTED MAY 21 1974　　　　　　　　　　3,811,655
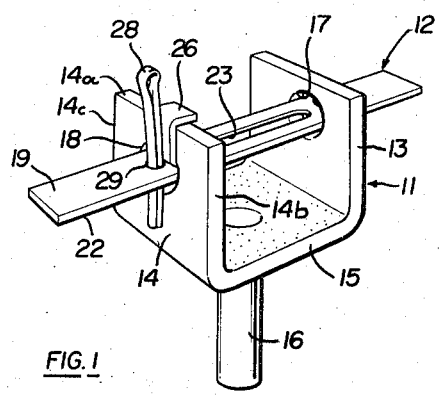
FIG. 1
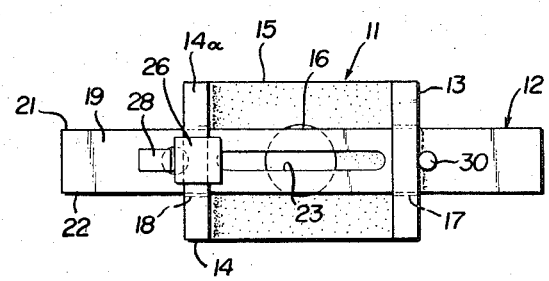
FIG. 3
FIG. 4
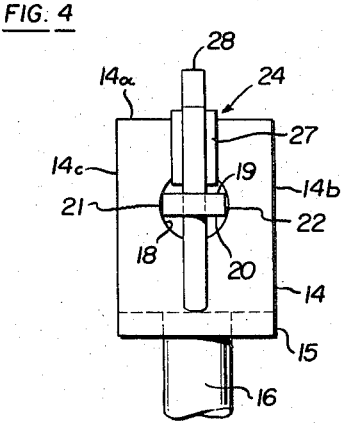
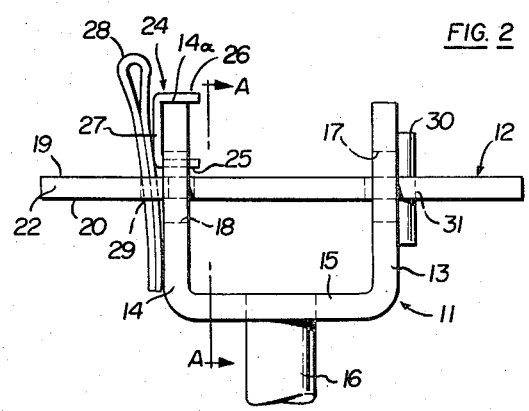
FIG. 2
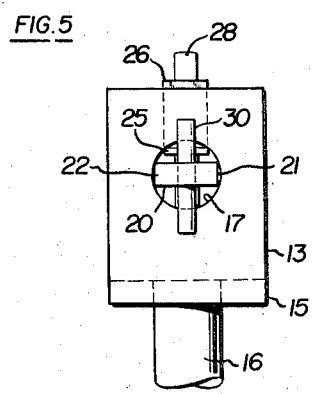
FIG. 5
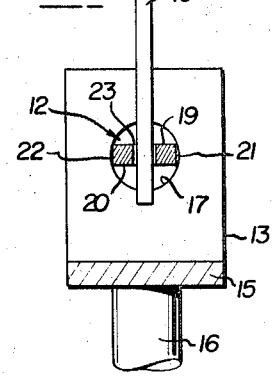
FIG. 6
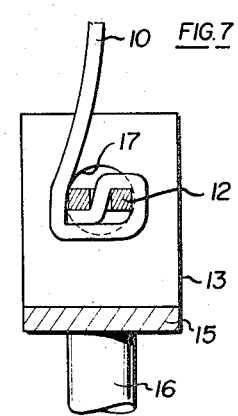
FIG. 7

TENSIONING DEVICE

BACKGROUND OF THE INVENTION

Certain known tensioning devices for tensioning flexible elements, such as straps, cables, wires, belts and the like, include a frame which supports a tensioning member that may be rotated to tension the flexible element. In such tensioning devices, the rotatable tensioning member is secured in a locking position on the frame, and it cannot be rotated unless it is first shifted axially from this locking position. Before the rotatable tension member can be so shifted, a locking device, (usually a nut threaded onto the rotatable tensioning member) must be loosened first. All of this involves a considerable manipulation of the various parts of the tensioning device in order to convert it back and forth between the locking mode and the tension-adjusting mode.

SUMMARY OF THE INVENTION

The present invention is directed to a novel and improved tensioning device in which the conversion between the locking mode and the tension-adjusting mode can be effected by a relatively simple procedure that does not require shifting the rotatable tensioning member axially in the frame.

It is a principal object of this invention to provide a novel and improved tensioning device for flexible elements, such as straps or cables and the like.

Another object of this invention is to provide such a tensioning device which may be converted from the locking mode to the tension adjusting mode, and vice versa, in a novel and convenient manner.

Another object of this invention is to provide such a tensioning device having a tensioning member that may be rotated to adjust the tension on an attached tensioning element and may be releasably locked in the position to which it has been rotatably adjusted, and in which the rotatable tensioning member need not be shifted axially for the purpose of locking or unlocking it.

Another object of this invention is to provide such a tensioning device in which a rotatable tensioning member need not be screw-threaded for coaction with a complementary locking member, such as a nut.

Another object of this invention is to provide a novel and improved tensioning device which is particularly well adapted for tensioning a tie-down for a trailer or the like.

Further objects and advantages of this invention will be apparent from the following detailed description of a presently preferred embodiment thereof, which is illustrated in the accompanying drawing, in which:

FIG. 1 is a perspective view of the present tensioning device;

FIG. 2 is a front elevational view;

FIG. 3 is a top plan view;

FIG. 4 is an end elevational view taken from the left end of the device in FIGS. 1 and 2;

FIG. 5 is an end elevational view taken from the right end of the device in FIGS. 1 and 2;

FIG. 6 is a vertical section taken along the line A — A in FIG. 2, with a strap or cable inserted into the device prior to being tensioned; and FIG. 7 is a view similar to FIG. 6, showing the position of the same elements after the strap or cable has been tensioned.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the teminology employed herein is for the purpose of description and not of limitation.

DETAILED DESCRIPTION

The tensioning device of the present invention may be used to tension a flexible element 10 (FIGS. 6 and 7), such as a strap, belt, cable, wire or the like, which may be a tie-down for a trailer or the like. The present tensioning device preferably is made entirely of suitable metal.

This tensioning device comprises a frame 11 and a tensioning member 12 that is engageable with the flexible element 10 to be tensioned and may be rotated in the frame 11 to tension this flexible element.

The frame 11 is generally U-shaped, presenting upstanding, spaced, opposite legs 13 and 14 and a base 15 interconnecting them at the bottom. The base 15 of the frame is suitably attached to a post or stem 16 that may be anchored in the ground in any suitable manner. The spaced legs 13 and 14 of the frame present circular openings 17 and 18, respectively, that are aligned coaxially with each other.

The tensioning member 12 is a rigid plate of oblong, rectangular cross-section, presenting flat, opposite, major faces 19 and 20. At its major cross-sectional dimension the plate 12 extends substantially completely across each opening 17 or 18 in the frame, so that the plate has a snug, rotatable fit in each of these openings at its minor faces 21 and 22, as shown in FIGS. 4 and 5. At the major faces 19 and 20 of the rotatable tensioning plate there is a gap or space between that face and the circular edge of the respective opening 17 or 18 in the frame.

Between the spaced legs 13 and 14 of the frame, the rotatable tensioning member 12 presents an elongated slot or aperture 23 extending between its opposite major faces 19 and 20. This slot snugly receives the flexible element 10 as shown in FIG. 6.

In accordance with the present invention, a removable locking member 24 acts between the rotatable tensioning member 12 and the frame 11 to lock the tensioning member 12 in whatever position it has been turned to. This locking member 24 is generally U-shaped, presenting a lower leg 25 (FIGS. 2 and 5) that extends laterally inward into the frame opening 18 adjacent one major face 19 of the rotatable tensioning member 12. Locking member 24 has an upper leg 26 that extends laterally inward snugly across the flat top edge 14a of the frame 14, and it has a vertical connecting segment 27 that extends between its upper and lower legs 26 and 25 across the outside of the frame leg 14.

When the locking member 24 is in place, as shown in the drawing, it acts between the frame leg 14 (at the opening 18 and the top edge 14a) and the rotatable tensioning member 12 to positively prevent the latter from turning.

For holding the locking member 24 in place, a first retainer member in the form of a cotter pin 28 is removably inserted through an opening 29 in the rotatable locking member 12 at the outside of the frame leg 14. As best seen in FIG. 2, this opening 29 is located so as to position the cotter pin 28 bearing snugly against the outside of the locking member 24 at the latter's lower end. The cotter pin 28 must be removed before the locking member 24 can be removed.

At the opposite side of the frame, the rotatable tensioning member 12 carries a second retainer member in the form of a cross pin 30 that bears against the outside of leg 13 of the frame to prevent the tensioning member 12 from being pulled axially to the left past the position shown in FIGS. 1 and 2. This cross pin 30 is snugly, but removably, seated in an opening 31 in the rotatable tensioning member 12 just outside the frame leg 13.

In the use of this tensioning device, with the cotter pin 28 and the locking member 24 removed, the end of the flexible element 10 that is to be tensioned is inserted down through the slot 23 in the rotatable tensioning member 12, as shown in FIG. 6. After this is done, the tensioning member 12 is turned any desired extent to apply the requisite tension to the flexible element 10, and then the locking member 24 is inserted in place (FIG. 2) to hold the rotatable tensioning member 12 in this rotational position, and the cotter pin 28 is inserted to hold the locking member 24 in place. The cross pin 30 engages the outside of the frame leg 13 to locate the rotatable tensioning member 12 axially during these operations.

If desired, the opening 18 in the frame leg 14 may be positioned equidistant from both side edges 14b and 14c and the top edge 14a, so that the locking member 24 may overlie one or the other of these side edges to lock the rotatable tensioning member 12 in a rotational position displaced 90° from the position shown in the drawing. With such an arrangement, the tensioning member 12 may be locked in any one of successive quarter-turn increments.

From the foregoing, it will be apparent that the present tensioning device can be converted from the locking mode to the tension-adjusting mode, and back again to the locking mode, in a ready and convenient manner that minimizes the manipulations involved and does not require shifting the rotatable tensioning member axially.

I claim:

1. In a tensioning device for tensioning a flexible element, such as a strap or cable, said tensioning device including a frame with spaced legs having respective circular openings therein, and a tensioning member extending between said legs and rotatably received in said openings and having means thereon for the attachment of said flexible element which is to be tensioned by the rotation of said tensioning member, the improvement which comprises a locking member removably insertable into one of said openings in the frame to prevent rotation of said tensioning member therein, said tensioning member being oblong in cross-section at said one opening, said tensioning member having a minor cross-sectional dimension at said one opening that is substantially smaller than said one opening to provide a space for receiving said locking member, and said locking member extending from said one opening across the corresponding leg of the frame to an outer edge of said leg and having opposite end extremities extending respectively into said one opening and across said outer edge.

2. A tensioning device according to claim 1, wherein said locking member extends across the outside of said corresponding leg of the frame.

3. A tensioning device according to claim 2, wherein said tensioning member has an opening therein at the outside of said corresponding leg of the frame, and further comprising a retainer member removably received in said opening in the tensioning member and holding said locking member in place locking said tensioning member against rotation.

4. A tensioning device according to claim 3, and further comprising a second retainer member carried by said tensioning member and engaging the outside of the other leg of the frame to locate said tensioning member axially.

5. In a tensioning device for tensioning a flexible element, such as a strap or cable, said tensioning device including a frame with spaced legs having respective openings therein, and a tensioning member extending between said legs and rotatably received in said openings and having means thereon for the attachment of the flexible element that is to be tensioned by the rotation of said tensioning member, the improvement which comprises means for selectively locking said tensioning member against rotation, said locking means being removably engageable between said frame and said tensioning member and removably insertable into one of said openings in said frame to prevent rotation of said tensioning member, said locking means having a generally U-shape and having opposite legs disposed respectively in said one opening and extending snugly across an outer edge of the frame leg having said one opening.

6. A tensioning device according to claim 5, wherein said tensioning member has an opening therein at the outside of said locking means and further comprising a pin removably received snugly in said last-mentioned opening and retaining the locking means in place.

7. A tensioning device according to claim 6, and further comprising a retainer member on said tensioning member at the outside of the other leg of the frame for holding the tensioning member against axial displacement.

8. A tensioning device according to claim 5, wherein said rotatable tensioning member is oblong in cross-section at said one opening, with its minor cross-sectional dimension substantially smaller than said opening to provide a space between them for receiving one leg of said U-shaped locking means.

* * * * *